United States Patent
Dame et al.

(10) Patent No.: US 9,434,290 B2
(45) Date of Patent: Sep. 6, 2016

(54) LOCKING MECHANISM FOR VEHICLE SLIDE-ROOM

(71) Applicants: Dennis Dame, Harrisburg, OR (US); Jeffrey Chase, Junction City, OR (US); Stefan Dale Crabtree, Coburg, OR (US); Benjamin B. Chase, Eugene, OR (US)

(72) Inventors: Dennis Dame, Harrisburg, OR (US); Jeffrey Chase, Junction City, OR (US); Stefan Dale Crabtree, Coburg, OR (US); Benjamin B. Chase, Eugene, OR (US)

(73) Assignee: Composite Solutions, Inc., Junction City, OR (US)

( * ) Notice: Subject to any disclaimer, the term of this patent is extended or adjusted under 35 U.S.C. 154(b) by 0 days.

(21) Appl. No.: 14/693,645

(22) Filed: Apr. 22, 2015

(65) Prior Publication Data

US 2015/0308546 A1 Oct. 29, 2015

Related U.S. Application Data

(60) Provisional application No. 61/983,412, filed on Apr. 23, 2014.

(51) Int. Cl.
*B60P 3/34* (2006.01)
*F16H 21/04* (2006.01)
*F16H 21/44* (2006.01)

(52) U.S. Cl.
CPC .................. *B60P 3/34* (2013.01); *F16H 21/04* (2013.01); *F16H 21/44* (2013.01)

(58) Field of Classification Search
CPC ........................................................ B60P 3/34
USPC .................. 296/165, 173, 171, 26.13, 26.14
See application file for complete search history.

(56) References Cited

U.S. PATENT DOCUMENTS

| 6,152,520 | A  | * | 11/2000 | Gardner | B60P 3/341 296/175 |
| 6,224,126 | B1 | * | 5/2001  | Martin  | B60P 3/34 296/165 |
| 6,536,821 | B1 | * | 3/2003  | Gardner | B60P 3/34 296/165 |
| 2002/0043813 | A1 | * | 4/2002 | McManus | B60P 3/34 296/26.13 |
| 2005/0161963 | A1 | * | 7/2005 | Peter | B60P 3/34 296/26.01 |
| 2005/0184546 | A1 | * | 8/2005 | Kunz | B60P 3/34 296/26.13 |
| 2006/0053700 | A1 | * | 3/2006 | Vance | E04B 1/3431 52/67 |
| 2008/0290689 | A1 | * | 11/2008 | Garceau | B60P 3/34 296/175 |
| 2012/0223540 | A1 | * | 9/2012 | Peck | B60P 3/34 296/26.04 |

* cited by examiner

*Primary Examiner* — Jason S Morrow
(74) *Attorney, Agent, or Firm* — Klarquist Sparkman, LLP

(57) ABSTRACT

Locking mechanism assemblies are provided for retaining a slide-room of a recreational vehicle in a retracted position. An exemplary assembly has a strut member extending between the slide-room and a wall of the recreational vehicle. The strut member is pivotable between a first position and a second position corresponding to an extended position and a retracted position, respectively, of the slide-room. The assembly further includes a guide member coupled to the strut member and movable therewith such that pivoting motion of the strut member between the first position and the second position causes corresponding linear motion of the guide member along a guide between a first position and a second position. The strut member applies a compressive force to the slide-room and a vehicle wall adjacent the slide-room to inhibit movement of the slide-room when the slide-room is in the retracted position.

10 Claims, 13 Drawing Sheets

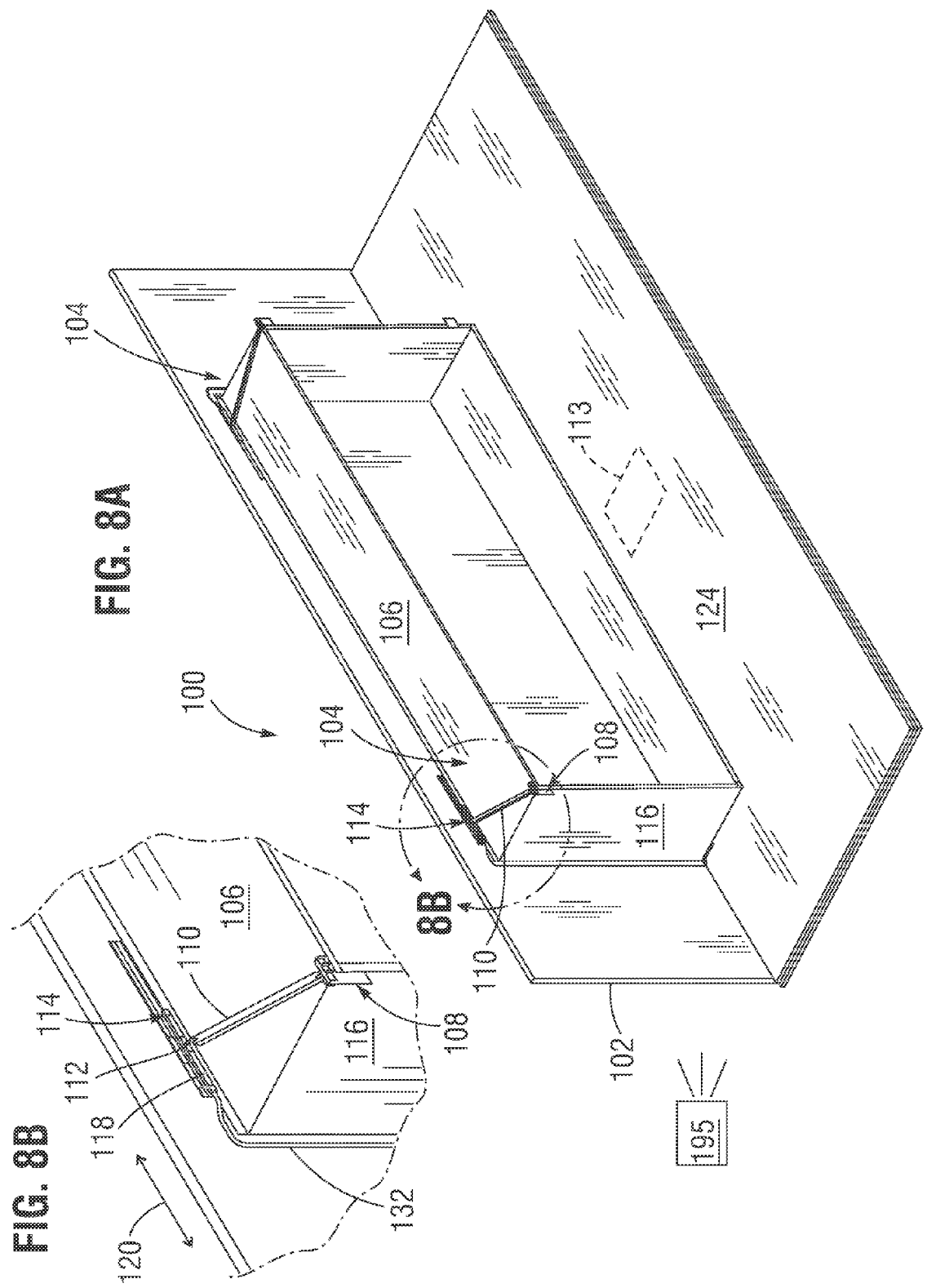

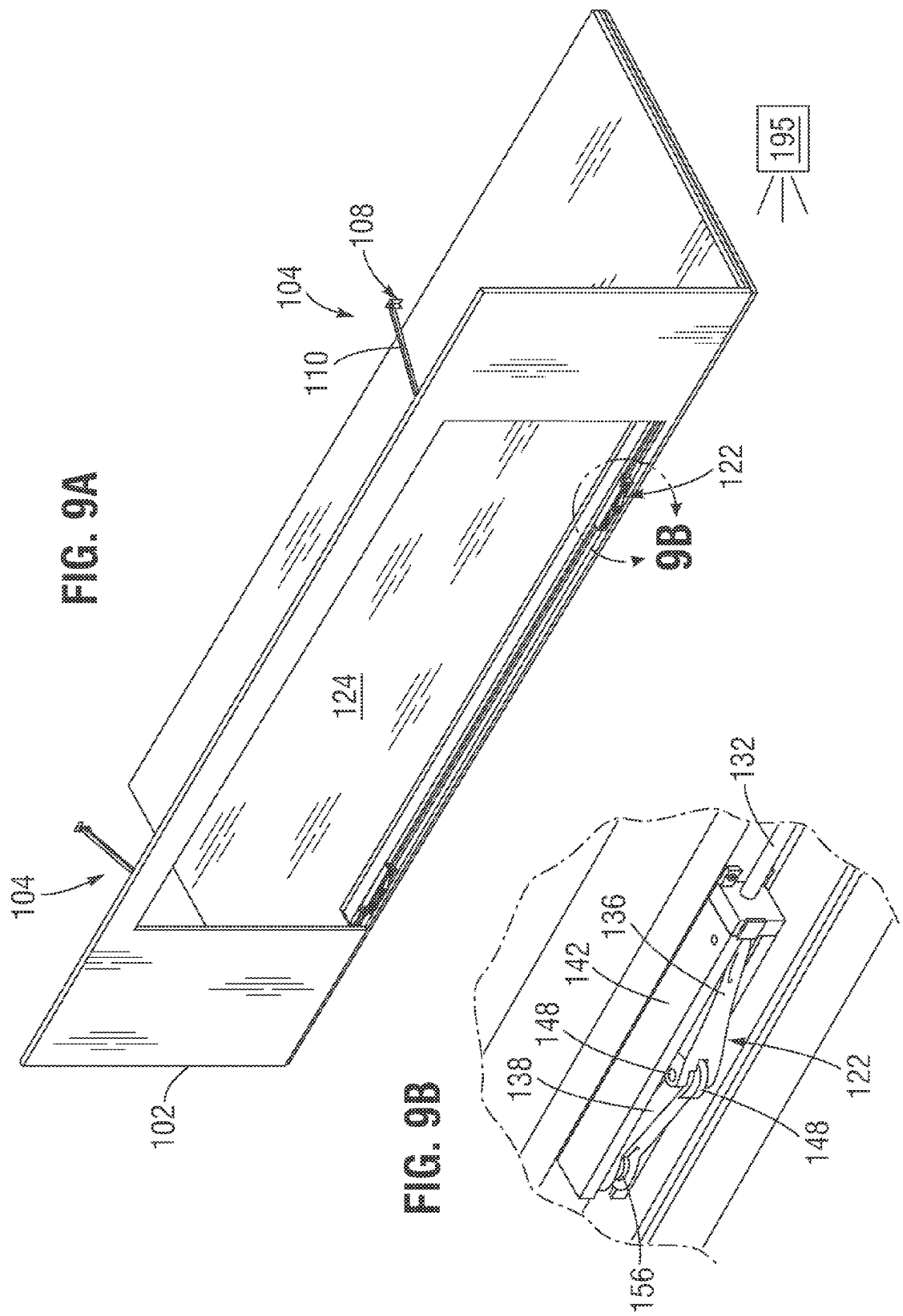

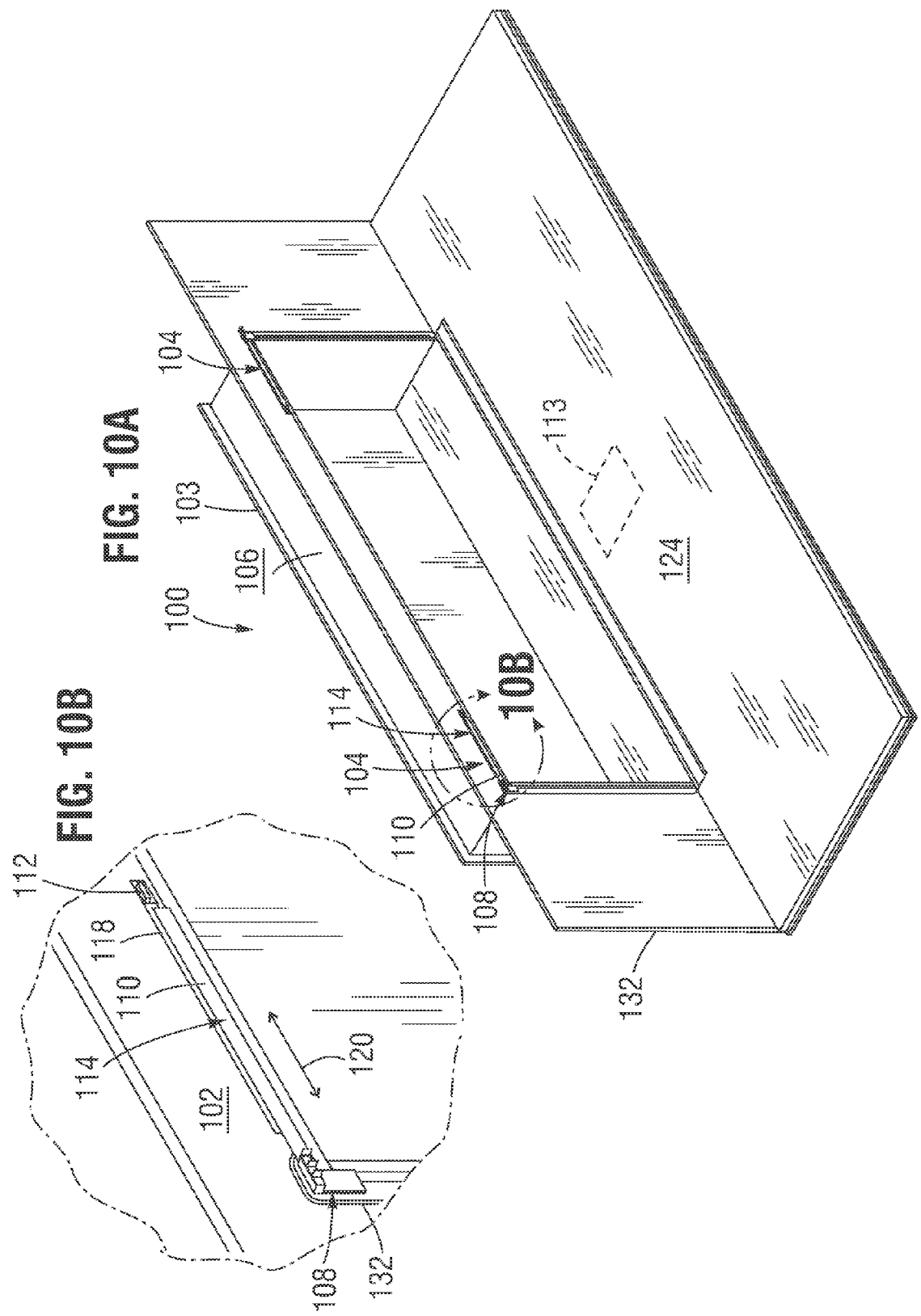

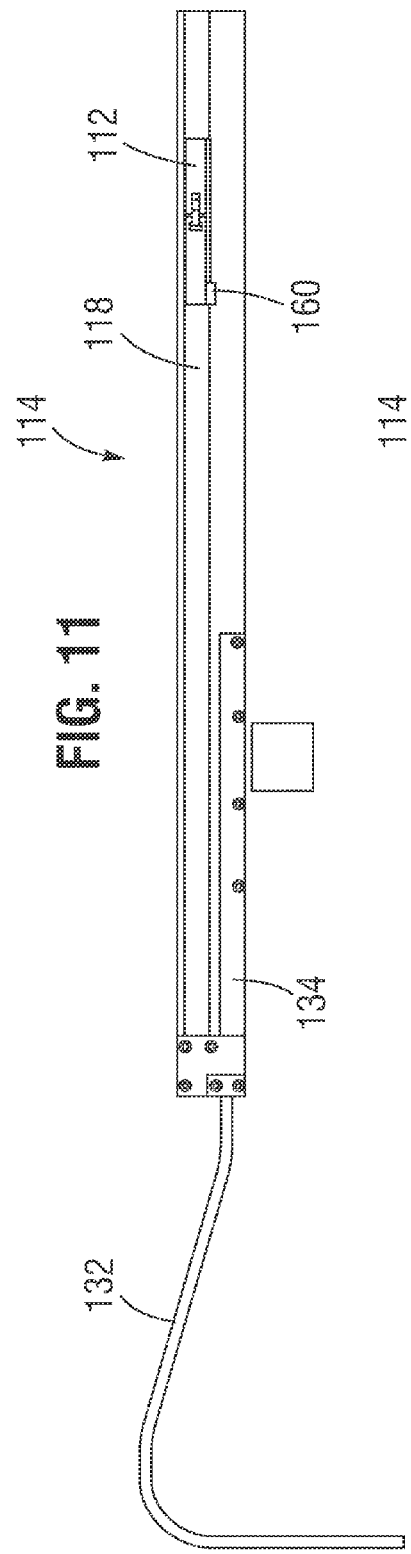
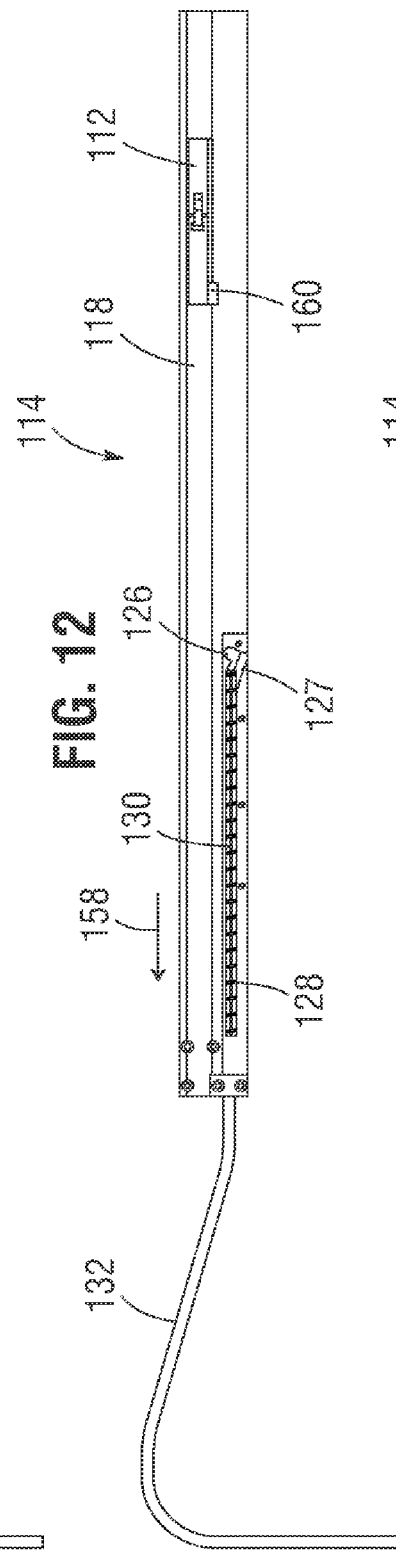
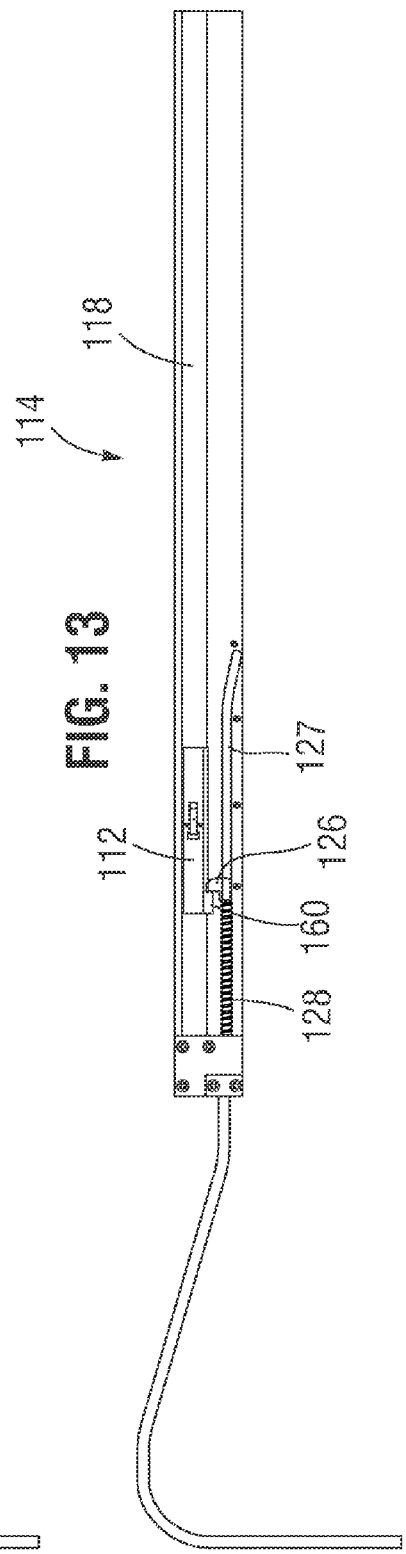

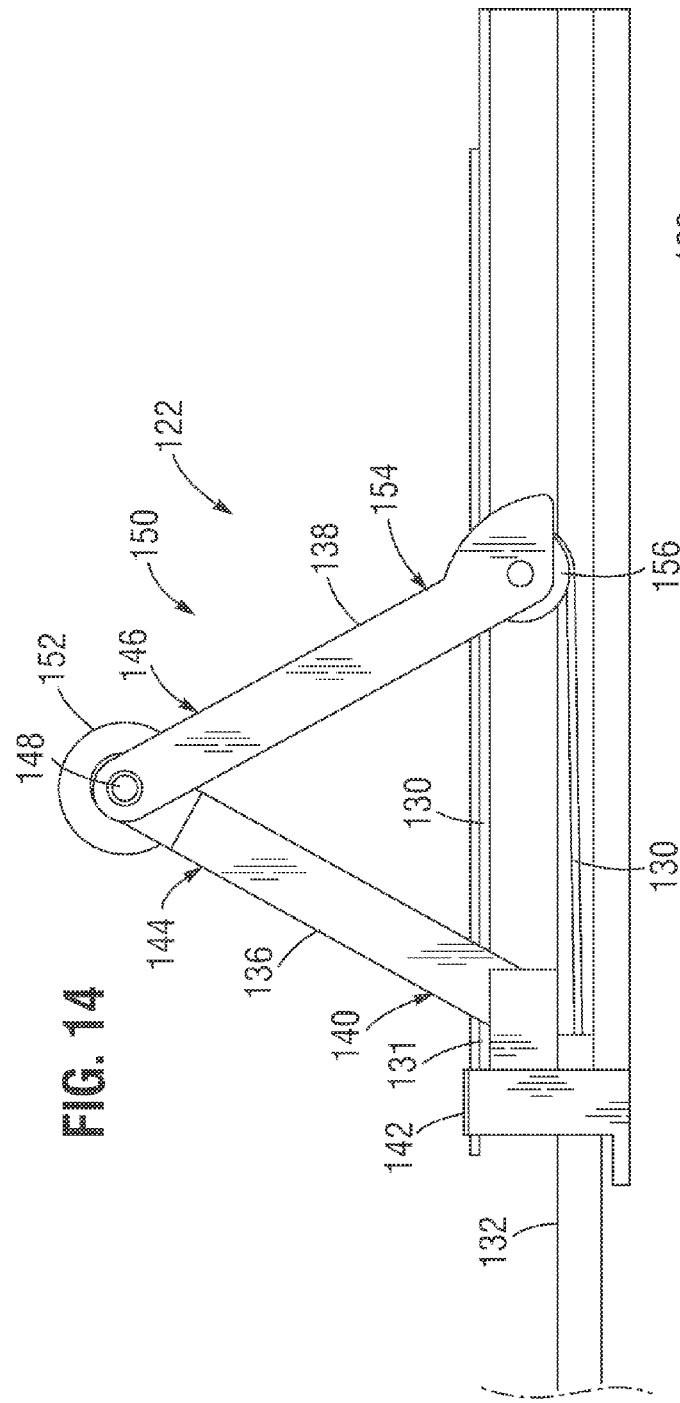
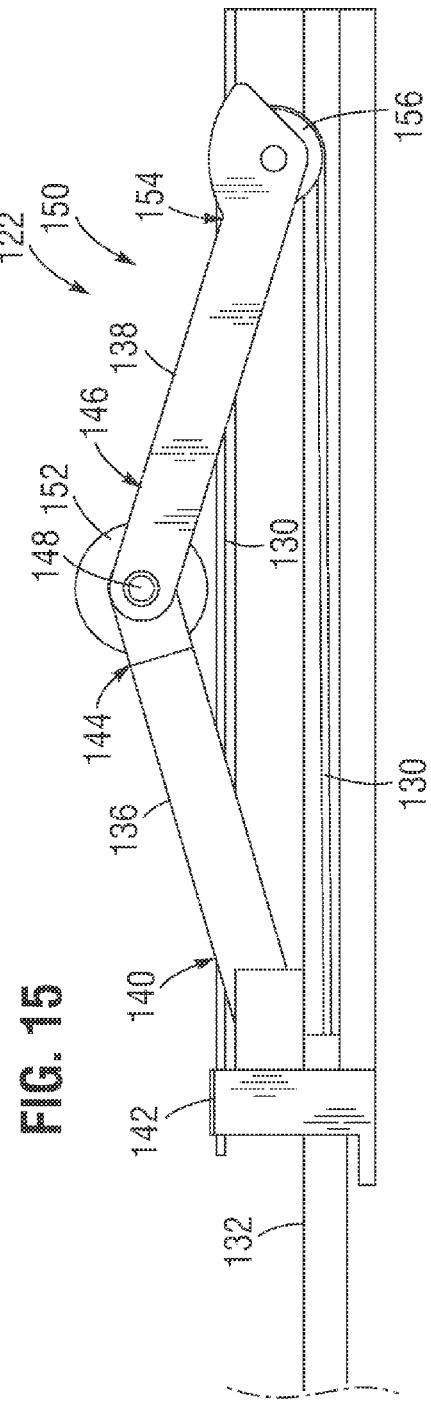

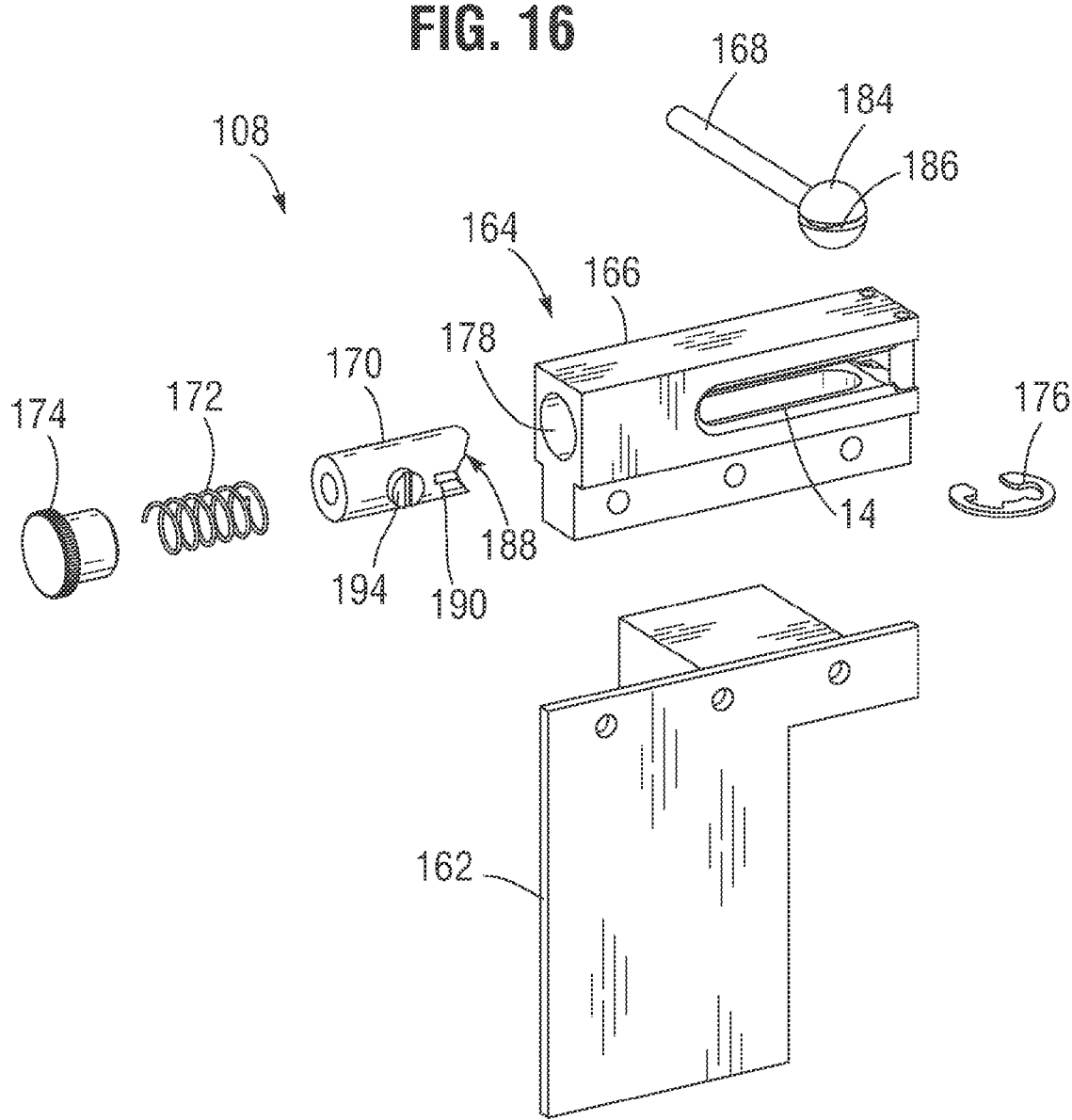

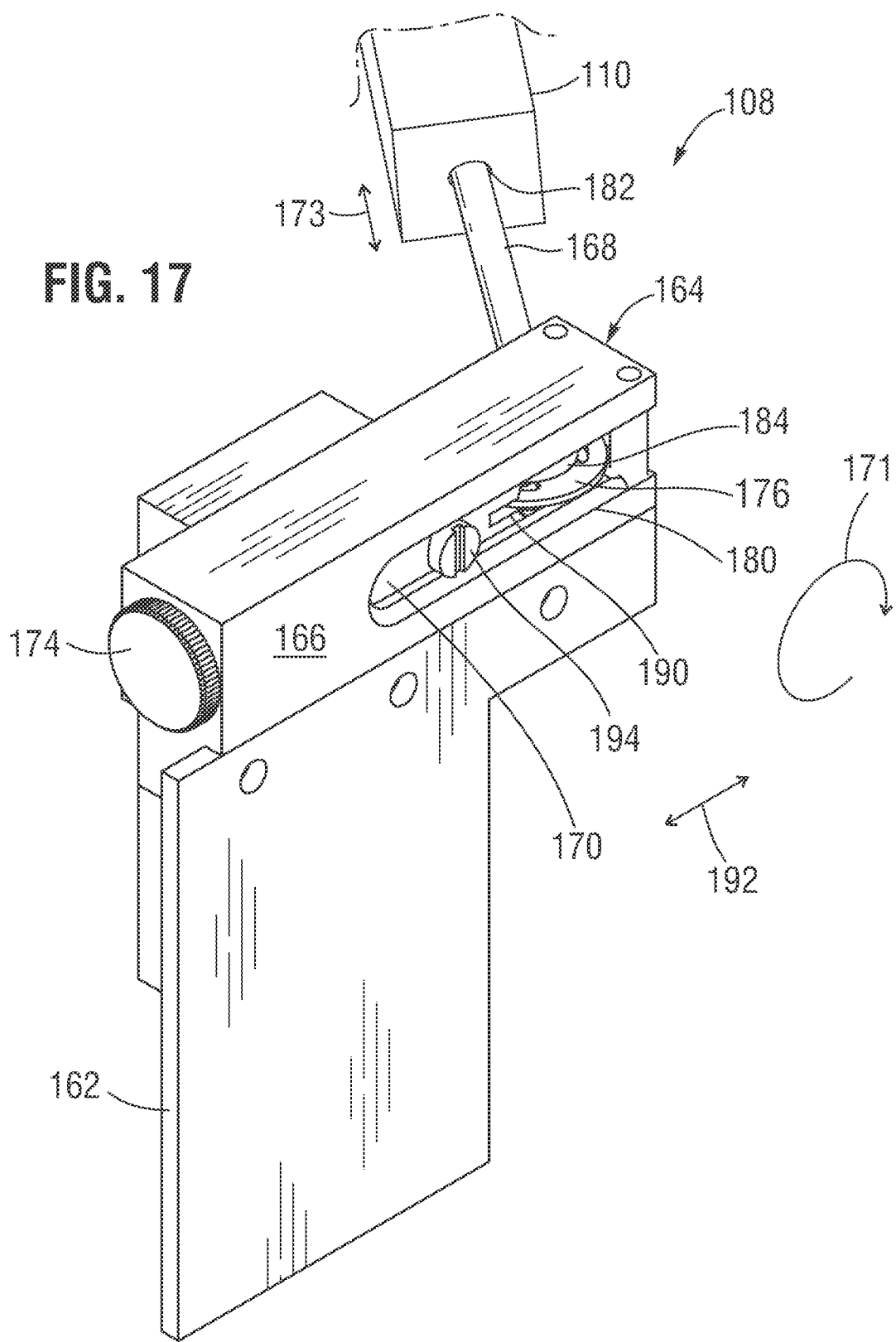

LOCKING MECHANISM FOR VEHICLE SLIDE-ROOM

CROSS REFERENCE TO RELATED APPLICATION

This application claims the benefit of U.S. Provisional Patent Application No. 61/983,412, filed Apr. 23, 2014, which is incorporated herein by reference.

FIELD

The present application pertains to embodiments of a locking mechanism for a vehicle slide-room.

BACKGROUND

Generally speaking, a recreational vehicle is any type of vehicle that has a living space, such as a kitchen, bathroom, sleeping area, etc. Recreational vehicles typically are classified in one of two different categories—motorhomes and towables. Motorhomes have an engine and integral driver compartment and therefore can be driven under their own power, while a towable must be coupled to and towed behind a driven vehicle for travelling from place to place.

A variety of recreational vehicles, including motorhomes and towables, are known that have a room or room portion that can be moved from a retracted position while the vehicle is being driven to an extended position when the vehicle is stationary to provide additional internal space. Such expandable rooms are commonly referred to as slide-rooms, slide-outs, slide-houses, slide-boxes, and tip-outs. A slide-room usually includes a floor, a roof, an external end wall (also referred to as a "face" or "face wall") (typically generally parallel to the vehicle side wall), an open (or openable) interior end wall, and one or more side walls (typically generally perpendicular to the vehicle side wall). These components are typically made of frame members and wall panels. In the retracted position, the roof, floor and side walls are typically concealed from exterior view and the room exterior end wall forms a portion of the vehicle side wall.

Various mechanisms are known for moving a slide-room between its expanded and retracted positions (typically referred to as slide mechanisms). A slide-room typically has an electric motor operatively coupled to a set of gears, cables, chains, and/or hydraulic arms configured to move the slide-room from its retracted position to its expanded position, and vice versa. A slide-room typically slides on a low-friction surface, such as UHMW, or if the slide-room is particularly heavy, it can ride on a set of rollers as it moves between its expanded and retracted positions.

Slide mechanisms typically are mounted below the floor of the slide-room. Consequently, when the slide-room is in the retracted position, the upper portion of the slide room can sway in and out relative to the vehicle wall, such as during transport of the vehicle. Thus, various locking mechanisms are known for locking or retaining a slide-room in its fully retracted position to prevent such inadvertent movement of the slide-room. Such locking mechanisms typically are mounted to the roof or side wall of the slide-room and require the manufacturer to a cut out a portion of the roof or side wall. Such cut-out portions are difficult to seal and therefore can allow water to leak into the slide-room. Further, if mounted on the roof of a slide-room, the locking mechanism typically protrudes upwardly from the roof and is rather bulky, thereby forming a structure that promotes formation of water puddles which can cause lead to mold.

As can be appreciated, there exists a strong need for new and improved locking mechanisms for slide-rooms.

SUMMARY

Certain embodiments of the present disclosure relate to devices for maintaining or locking a slide-room of a recreational vehicle in a retracted position. In a representative embodiment, an assembly for retaining a slide-room of a recreational vehicle in a closed position comprises a strut member extending between the slide-room and a wall of the recreational vehicle, the strut member being pivotable between a first position and a second position corresponding to an extended position and a retracted position, respectively, of the slide-room. The assembly further comprises a guide member coupled to the strut member and movable therewith such that pivoting motion of the strut member between the first position and the second position causes corresponding linear motion of the guide member along a guide between a first position and a second position. The strut member applies a compressive force to the slide-room and a vehicle wall adjacent the slide-room to inhibit movement of the slide-room when the slide-room is in the retracted position.

The foregoing and other objects, features, and advantages of the disclosed embodiments will become more apparent from the following detailed description, which proceeds with reference to the accompanying figures.

BRIEF DESCRIPTION OF THE DRAWINGS

FIG. 8A is a rearwardly-oriented perspective view of a slide-room situated in a vehicle wall in a retracted position and including another embodiment of a locking assembly.

FIG. 8B is an enlarged view of the portion of the locking assembly indicated in FIG. 8A.

FIG. 9A is a front-oriented perspective view of the vehicle wall of FIG. 8A illustrating the locking assembly with the slide-room removed.

FIG. 9B is an enlarged perspective view of the portion of the locking assembly indicated in FIG. 9A.

FIG. 10A is a rearwardly-oriented perspective view of the slide-room and vehicle wall of FIG. 8A illustrating the slide-room in an extended position.

FIG. 10B is an enlarged perspective view of the portion of the locking assembly indicated in FIG. 10A.

FIGS. 11-13 are side elevation views of a representative embodiment of a retaining assembly.

FIGS. 14-15 are side elevation views of a representative embodiment of an actuator assembly.

FIG. 16 is an exploded view of a representative embodiment of a bracket assembly.

FIG. 17 is a perspective view of the bracket assembly of FIG. 16.

DETAILED DESCRIPTION

As used herein, the term "vehicle" refers generally to any vehicle that has a power source (e.g., motor or engine) or a towable vehicle that is coupled to a driven vehicle for travelling from place to place. A vehicle can include, without limitation, a tractor-trailer, a folding camping trailer, a truck camper, a conventional travel trailer, a fifth wheel travel trailer, a sport utility recreational vehicle, a motorhome (e.g., class A, B, and C motorhomes), a horse trailer, a military trailer, or a utility trailer, to name a few. The embodiments of locking mechanisms disclosed herein can also be installed in slide-rooms installed in less mobile structures, such as mobile homes, house boats, mobile offices or command centers. If desired, the locking mechanisms can be used for slide-rooms installed in permanent structures, such as houses, stores, etc.

Figure 1:
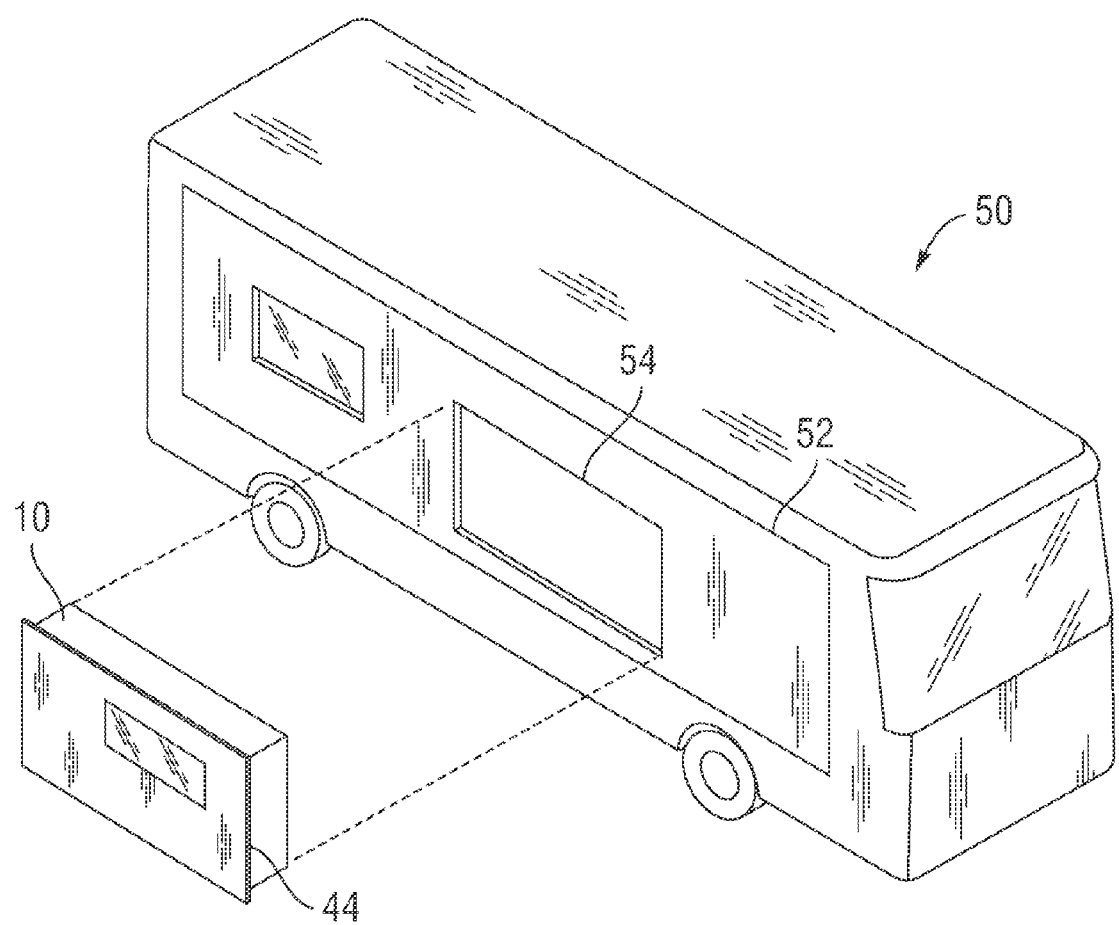
FIG. 1 illustrates a representative embodiment of a recreational vehicle including a slide-room.

FIG. 1 illustrates a representative vehicle 50 in the form of a recreational vehicle (RV) having an exterior wall 52 defining an opening 54 for receiving a slide-room 10. The slide-room 10 can be movable between an extended position and a retracted position by, for example, one or more actuators or slide mechanisms situated beneath the slide-room. In the illustrated embodiment, the slide-room can also include a peripheral flange 44.

Figure 2:
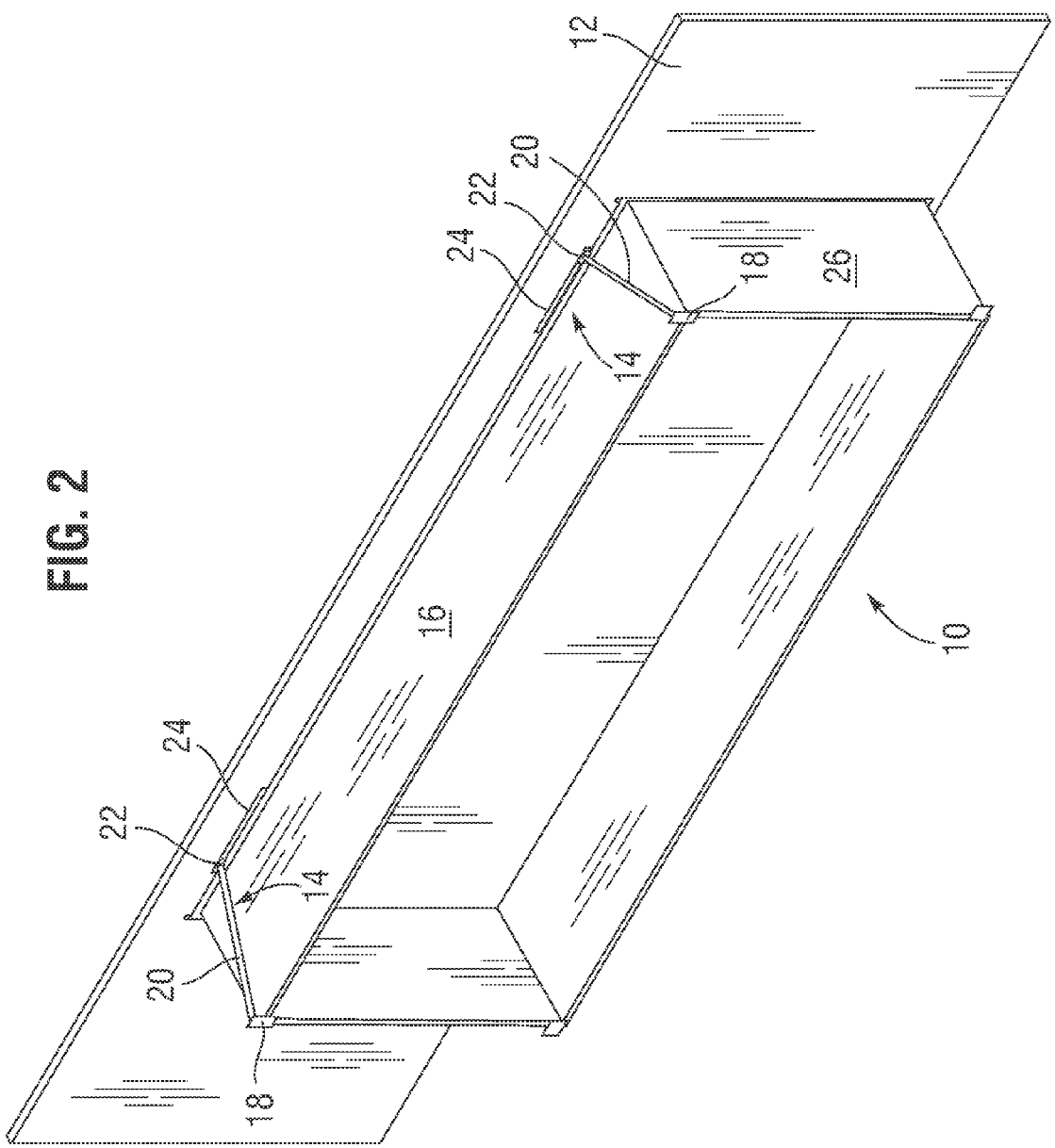
FIG. 2 illustrates a slide-room situated in a vehicle wall and including a representative embodiment of a locking assembly.
Figure 4:
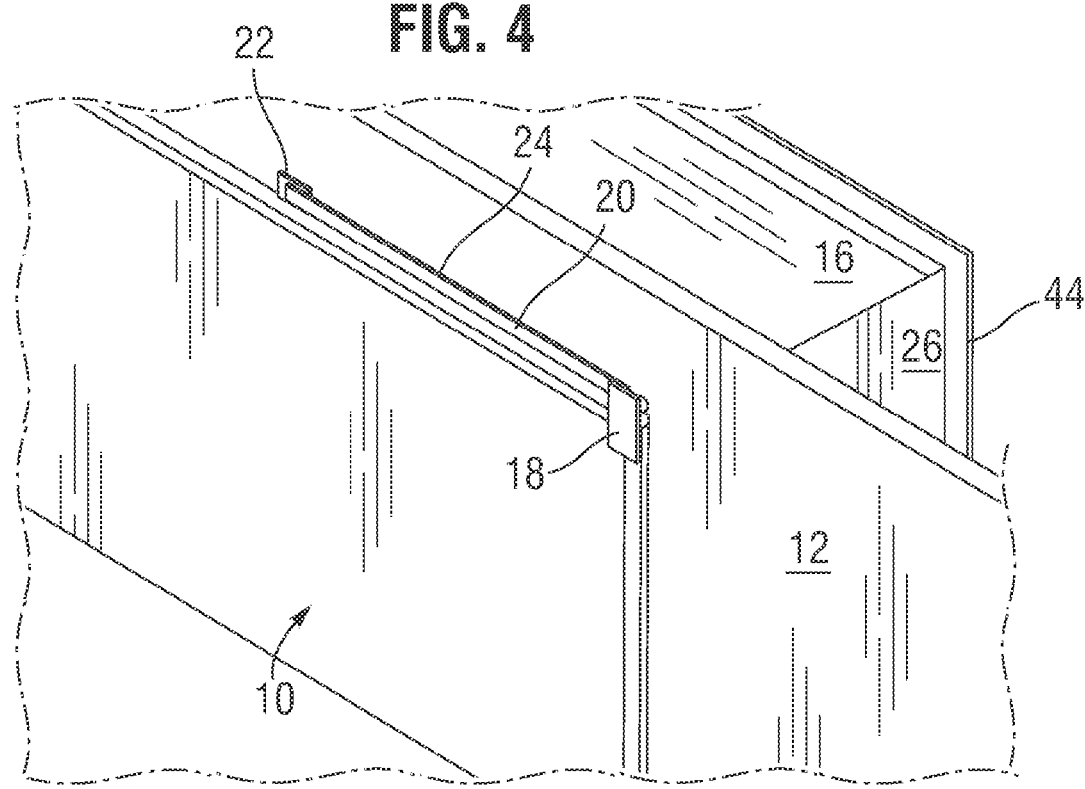
FIG. 4 is a perspective view of a portion of the locking assembly of FIG. 1 with the slide-room in an extended position.

Referring first to FIG. 2, there is shown a slide-room 10 installed in a side wall 12, which can be the side wall of a vehicle or the side wall of a non-mobile structure. The slide-room 10 is movable between a retracted position (FIG. 2) and an extended position (FIG. 4). Any of various known mechanisms and/or techniques can be used to effect movement of the slide-room between the retracted and extended positions. As shown in FIG. 2, the slide-room 10 in the illustrated embodiment is equipped with two locking mechanisms 14 mounted on opposite sides of the roof 16 of the slide-room.

Figure 3:
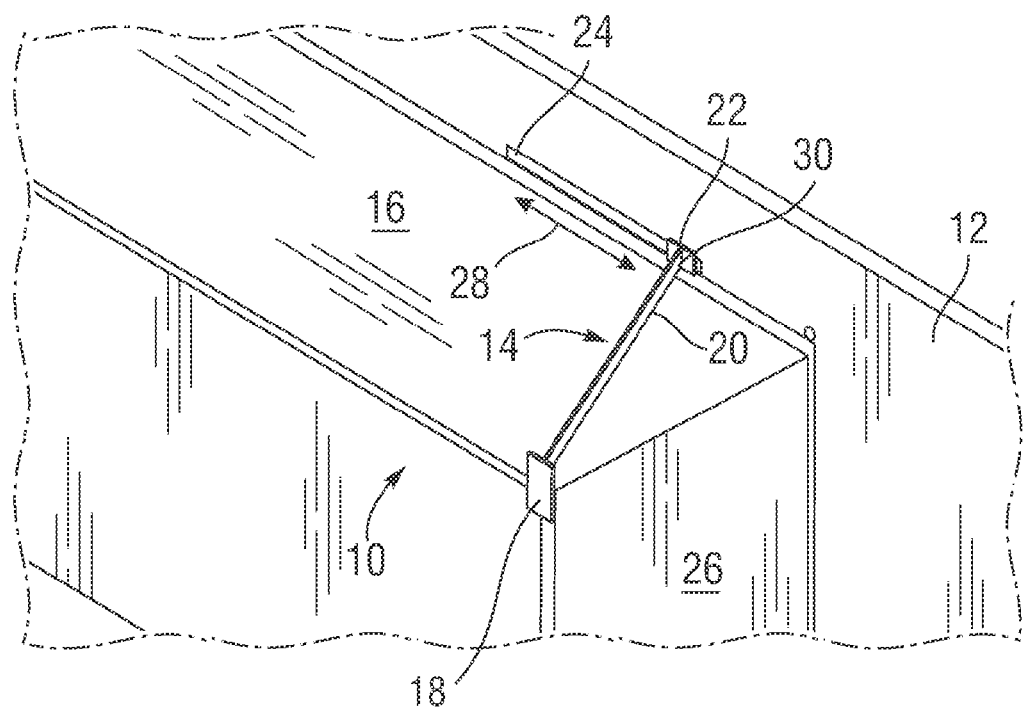
FIG. 3 is a perspective view of a portion of the locking assembly of FIG. 1 with the slide-room in a retracted position.

FIG. 3 is an enlarged view of one of the locking mechanisms 14. The locking mechanism 14 in the illustrated configuration comprises a bracket 18, a strut 20, a guide member 22, and a rail 24. The bracket 18 can be mounted at the rear of the slide-room adjacent the corner of the roof 16 and a side wall 26 of the slide-room (the "rear" of the slide-room is the end positioned farthest inside of the vehicle). The strut 20 has a first end portion hingedly connected to the bracket 18 and a second end portion hingedly connected to the guide member 22. The guide member 22 is slidably mounted on the rail 24 and can move side-to-side along the rail in the directions indicated by double-headed arrow 28. The rail 24 is mounted to the inner surface of the wall 12 adjacent the roof 16 of the slide-room.

As further illustrated in FIG. 3, the forward end portion of the strut 20 is coupled to the guide member 22 by a hinge 30, which can be any of various suitable hinges that allows the strut 20 to pivot relative to the guide member 22. Similarly, the rear end portion of the strut 20 is coupled to the bracket 18 by a respective hinge that allows the strut to pivot relative to the bracket 18.

The strut 20 can be formed from any of various types of materials, such as round stock, square or rectangular tubing, angled or flat bar stock, and can metal (e.g., aluminum or steel), wood, fiberglass, etc. The rail 24 can be formed from metal or a low-friction polymer, such as polyethylene, ultra-high-molecular-weight polyethylene (UHMW), or polytetrafluoroethylene (PTFE). Alternatively, the rail 24 can comprises a base layer (such as formed from metal) and a low-friction polymer coating (e.g., polyethylene, UHMW, or PTFE) extending over and covering the exposed surface of the base layer. Similarly, the guide member 22 can be made of a metal, a low-friction polymer, or a base layer coated with a low-friction polymer with the polymer layer being in contact with the rail 24. In certain embodiments, the guide member 22 can be provided with bearings or rollers that are in contact with the rail 24 to facilitate side-to-side movement of the guide member 22 along the rail.

In the illustrated embodiment, the locking mechanisms 14 on both sides of the slide-room 10 have the same components. In alternative embodiments, the slide-room can be equipped with only one locking mechanism 14.

When the slide-room 10 is moved between the retracted position (FIG. 2) and the extended position (FIG. 4), the strut 20 of each locking mechanism 14 can pivot relative to the respective bracket 18 and guide member 22, and the guide member 22 can slide along the respective rail 24. As best shown in FIG. 4, when the slide-room 10 is in the fully extended position, the strut 20 can lie flat against the inner surface of the wall 12.

Each locking mechanism 14 can include a retaining device or retaining assembly that prevents movement of the guide member 22 along the rail 24 when the slide-room 10 is in the retracted position and/or the extended position. Preventing movement of the guide members 22 along the rails 24 inhibits movement of the slide-room relative to the wall.

Figure 5:
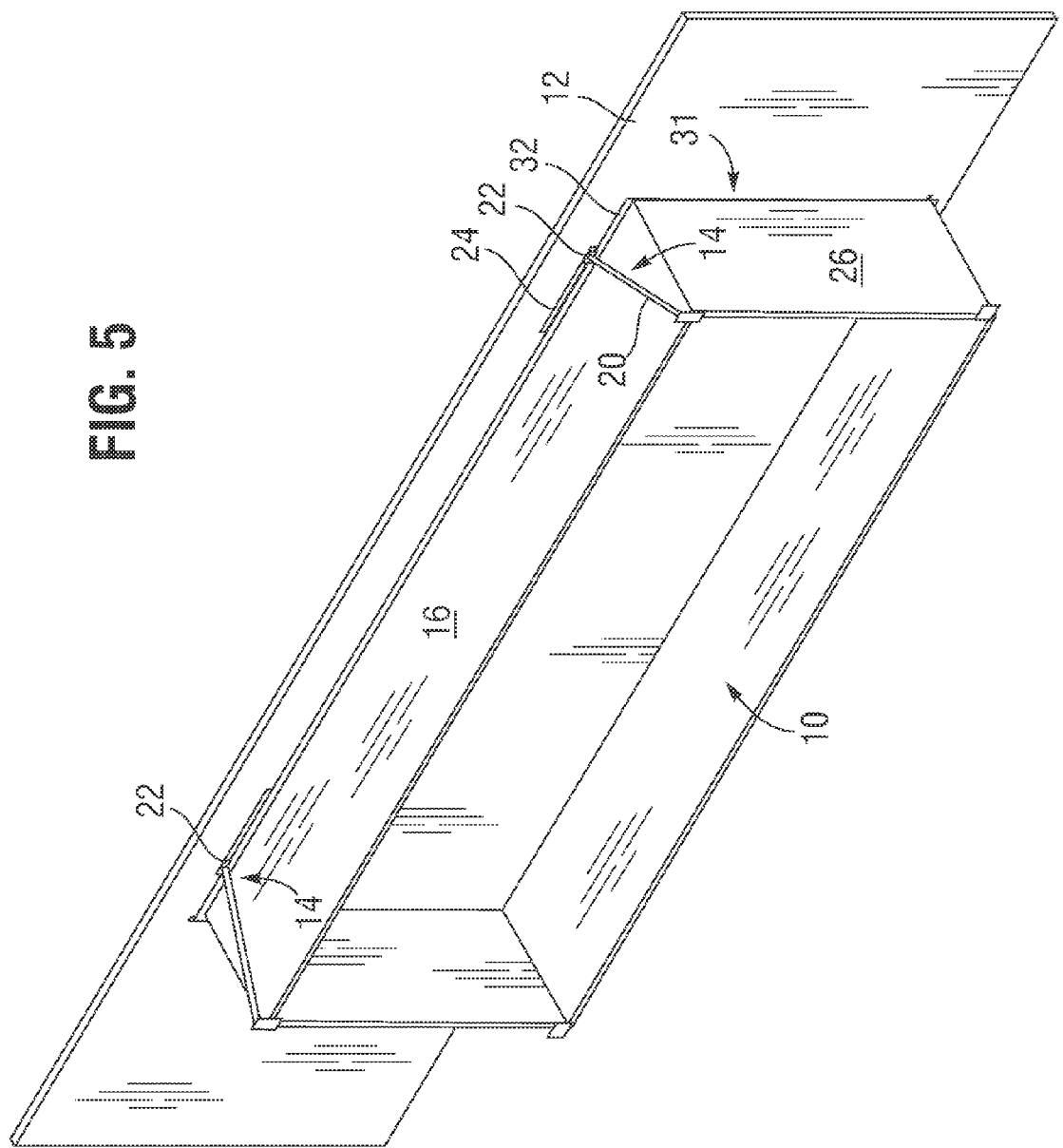
FIG. 5 is perspective view of the locking assembly of FIG. 1 further including a retaining assembly.
Figure 6:
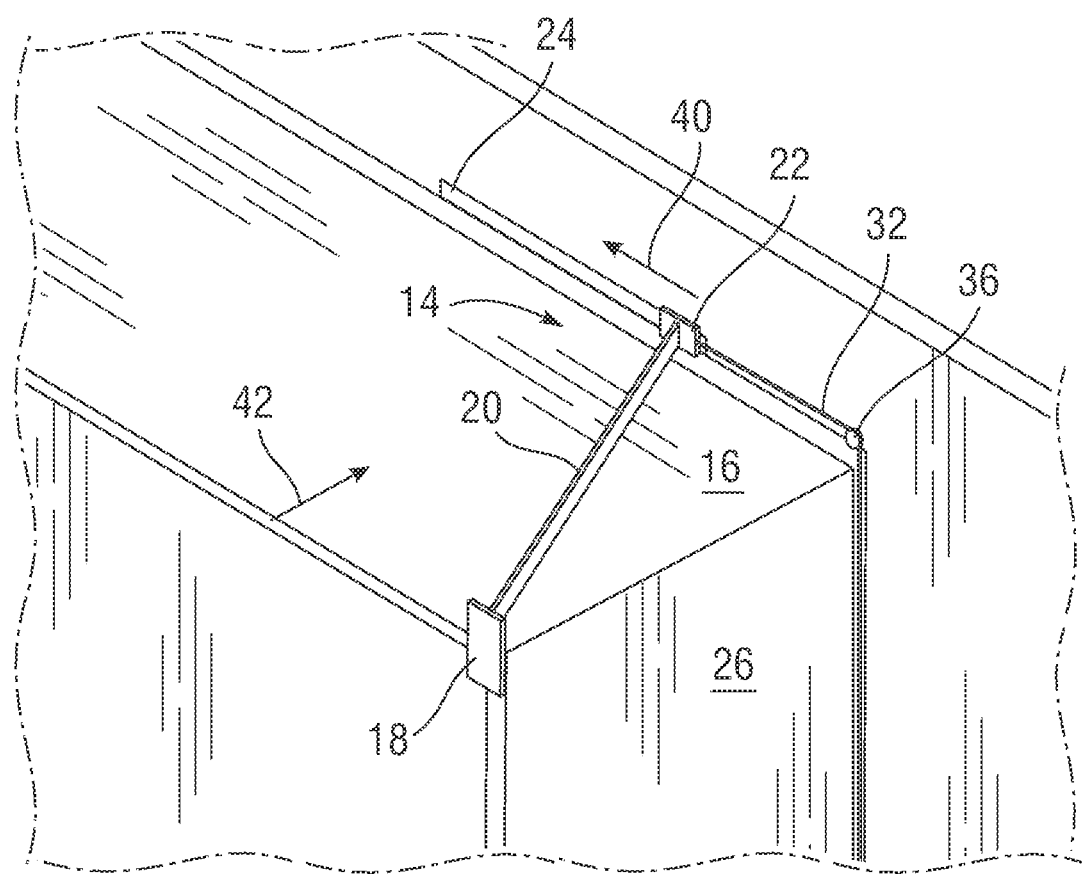
FIG. 6 is a perspective view of a portion of the locking assembly of FIG. 5 adjacent a roof of the slide-room.
Figure 7:
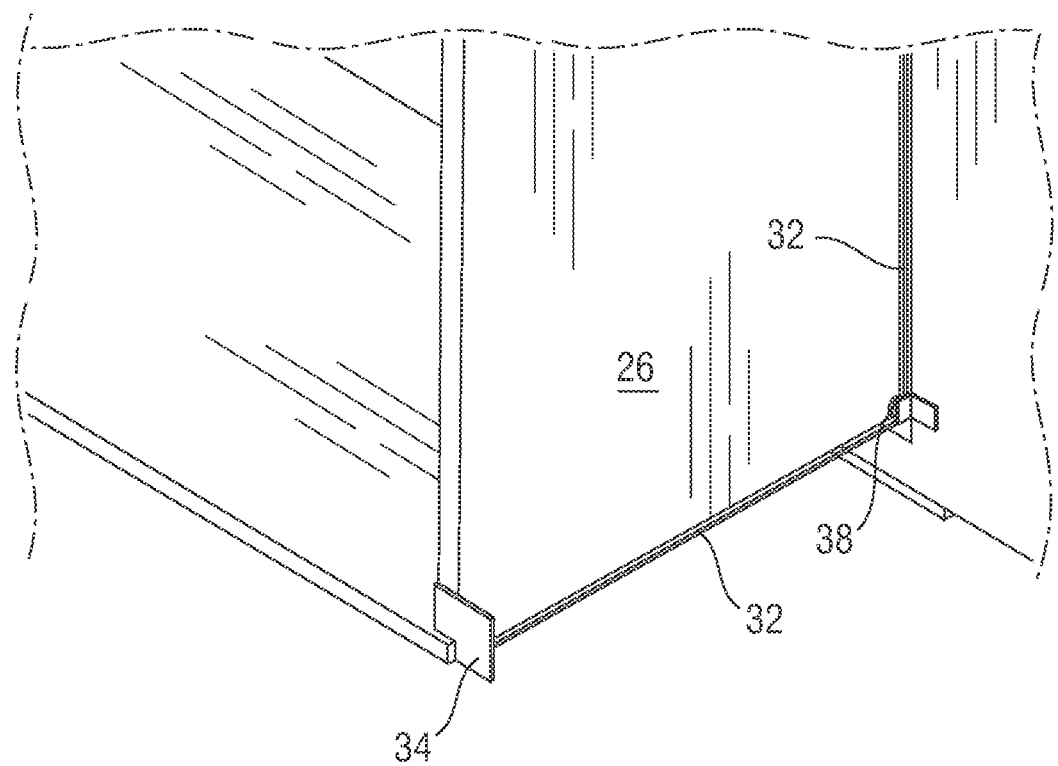
FIG. 7 is perspective view of the locking assembly of FIG. 5 adjacent a floor of the slide-room.

FIGS. 5-7 show an exemplary embodiment of a retaining assembly 31 that is configured to resist movement of the guide member 22, and thus movement of the slide-room, when the slide-room is in the retracted position. The assembly 31 in the illustrated embodiment comprises a cable 32 that is attached at one end to the guide member 22 (FIG. 6) and at the opposite end to a bracket 34 (FIG. 7) that is mounted on the rear of the slide-room adjacent the corner of the side wall 26 and the floor of the slide-room. The cable 32 can be supported by a first pulley 36 (FIG. 6) and a second pulley 38 (FIG. 7). The first pulley 36 can be mounted to the inner surface of the wall 12 adjacent the corner of the roof 16 and the side wall 26 of the slide-room. The second pulley 38 can be mounted to the inner surface of the wall 12 adjacent the corner of the floor and the side wall 26 of the slide-room. Although one assembly 31 is shown in the illustrated embodiment, each of the locking mechanisms 14 can be provided with a respective retaining assembly 31.

The cable 32 is tensioned such that the cable can resist movement of the guide member 22 toward the center of the slide-room (in the direction of arrow 40 in FIG. 6) to prevent inadvertent movement of the slide-room when it is in the retracted position, such as may be caused by movement of the vehicle during transport, yet allow the slide-room to be moved from the retracted position to the extended position when a force is applied to the slide-room in the direction of arrow 42, such as from the slide mechanism that automatically moves the slide-room. The tension on the cable 32 can be such that the cable can exert sufficient force on the slide-room to retain the outer flange 44 of the slide-room flush against the outer surface of the wall 12 or against a seal mounted on the outer surface of the wall 12.

Other techniques and/or mechanisms can be used to prevent movement of the guide member 22. In another embodiment, for example, a cable brake can be mounted on the inner surface of the wall 12 and can be configured to apply a braking force against the cable 32 when the slide-room approaches the retracted position (e.g., when the slide-room moves within 1-2 inches of the fully retracted position) or when the slide-room reaches the fully retracted position. The cable brake can be automatically controlled to apply and release a braking force on the cable 32 when the slide-room is moved toward and away from the retracted position.

In another embodiment, a retaining device can comprise a locking pin (not shown) that can be mounted to the inner surface of the wall 12 and can be configured to extend into or otherwise engage a guide member 22. The locking pin can move between a locked position engaging the guide member and an unlocked position disengaged from the guide member. The locking pin can be actuated by, for example, an electric solenoid. Also, the locking pin can be automatically activated to move to the locked position when the slide-room is moved to the retracted position. In another embodiment, a second locking pin can be mounted on the inner surface of the wall 12 so as to engage the guide member when the slide-room is in the fully extended position.

Also, in alternative embodiments, a locking mechanism 14 can be mounted to one or both vertical side walls 26 of the slide-room, in lieu of or in addition to one or more locking mechanisms mounted on the roof 16 of the slide-room.

FIGS. 8A-10B illustrate another embodiment of a slide-room 100 situated in a vehicle wall 102 including a peripheral flange 103 and two locking assemblies 104 mounted on opposite sides of the slide-room. Each locking assembly 104 can include a respective retaining assembly 114 mounted to the inner surface of the wall 102 adjacent the roof 106 of the slide-room (FIGS. 8A-8B), and a respective actuator assembly 122 shown mounted to the vehicle at a location beneath the slide-room adjacent a vehicle floor 124 (FIGS. 9A-9B). For convenience, the arrangement and operation of the system is described with respect to a single locking assembly 104. However, it should be understood that the locking assemblies 104 on both sides of the slide-room can comprise substantially the same components and operate in a substantially analogous manner.

FIG. 8B is an enlarged view of an upper portion of one of the locking assemblies 104. In the illustrated configuration, the locking assembly 104 additionally comprises a strut member 110 extending between a bracket assembly 108 mounted at the rear of the slide-room and a guide member 112 of the retainer assembly 114. The bracket assembly 108 can be mounted adjacent the corner of the roof 106 and a side wall 116 of the slide-room, or at any other suitable location, and is described in greater detail below. The strut member 110 can have a first end portion pivotably connected to the bracket assembly 108 and a second end portion pivotably connected to the guide member 112, and can be pivotable between an first position (FIGS. 10A-10B) (corresponding to an extended position of the slide-room) and a second position (FIGS. 8A-8B) (corresponding to a retracted position of the slide-room). In some embodiments, the strut member 110 can have a length such that it is compressed between the bracket assembly 108 and the vehicle wall 102 in the position illustrated in FIGS. 8A and 8B, thereby applying a compressive force to the slide-room 100 and the wall 102 to keep the slide-room in the retracted position.

The guide member 112 can be slidably mounted along a guide configured as a rail 118 of the retainer assembly 114. The guide member 112 can be movable side-to-side along the rail 118 in the directions indicated by double-headed arrow 120 from a first position on the right side of the rail 118 (FIG. 10B) (corresponding to an extended position of the slide-room) and a second position on the left side of the rail 118 (FIG. 8B) (corresponding to a retracted position of the slide-room). In this manner, the guide member 112 can be movable together with the strut member 110 such that pivoting motion of the strut member causes corresponding linear motion of the guide member 112 along the rail 118 as the slide-room moves between the extended and retracted positions. Although the guide member 112 moves along a rail 118 in the illustrated embodiment, it should be understood that the guide member 112 can move along any suitable guide in or on the retainer assembly 114, such as a groove, a track, etc.

FIGS. 11-13 illustrate a representative embodiment of the retainer assembly 114 and the guide member 112 in greater detail. The retaining assembly 114 can further include a retaining member configured as a hook 126 movable in a guide configured as a track 127 between a first position (FIG. 12) (corresponding to the extended position of the slide-room) and a second position (FIG. 13) (corresponding to the retracted position of the slide-room). The hook 126 can be coupled to a spring 128, which can be movable with the hook 126 between a compressed state and an uncompressed state in the track 127. The spring 128 can be coaxially situated about a cable 130 (e.g., a Bowden cable) configured to travel in a conduit or housing 132. The cable 130 can be coupled to the hook 126, and can extend between the retainer assembly 114 and a respective actuator assembly 122. Operation of the respective components of the retainer assembly 114 is explained in greater detail below. In use, the retainer assembly 114 can include a cover plate 134 fastened over the hook 126 and spring 128, as illustrated in FIG. 11.

FIGS. 14-15 illustrate a representative embodiment of the actuator assembly 122 in greater detail. Each actuator assembly 122 can include an articulable linkage 150 including a first pivot member 136 and a second pivot member 138 pivotably coupled to one another end-to-end and movable between a first position (FIG. 14) (corresponding to an extended position of the slide-room) and a second position (FIG. 15) (corresponding to a retracted position of the slide-room). A first end portion 140 of the first pivot member 136 can be pivotably coupled to a frame portion 142 of the actuator assembly. Meanwhile, a second end portion 144 of the first pivot member 136 can be pivotably coupled to a first end portion 146 of the second pivot member 138 by, for example, a pin 148. In the illustrated embodiment, a resilient member 152 can be disposed at the junction between the first and second pivot members 136, 138, corresponding substantially to a midpoint of the articulable linkage 150. A second end portion 154 of the second pivot member 138 can include a pulley 156 in frictional engagement with the cable 130. The cable 130 can be situated about the pulley 156 and can have an end portion 131 affixed to the frame portion 142 at, for example, a location adjacent the first end portion 140 of the first pivot member 136. In this manner, motion of the articulable linkage between the first position and the second position can increase the tension in the cable 130 and draw the cable into the frame portion 142. Although the actuator assemblies 122 are shown mounted to the vehicle at a location beneath the slide-room in the illustrated embodiment, it should be understood that they can be mounted at any suitable location on the vehicle adjacent the perimeter of the slide-room.

Operation of the locking assemblies 104 will now be described. Initially, the slide-room 100 can be in the extended position. As illustrated in FIG. 10B, the strut member 110 can be disposed substantially flat against the retaining assembly 114 and/or the inner surface of the vehicle wall 102, and the guide member 112 can be in the first position (e.g., disposed to the right on the rail 118 in the illustrated embodiment). Inside the retaining assembly 114, the hook 126 can be in the first position (e.g., disposed to the right in the track 127) and the spring 128 can be in the uncompressed state. As illustrated in FIG. 14, the articulable linkage 150 of the actuator assembly 122 can be in the first position. As the slide-room is retracted inside the vehicle, the strut member 110 can pivot about its respective hinges, causing the guide member 112 to move along the rail 118 (e.g., to the left in FIGS. 8A and 8B). The strut member 110 is thereby passively actuated to move from the first position to the second position by motion of the slide-room.

As the slide-room is retracted, a portion of the slide-room (for example, a portion of the peripheral flange 103) can contact the resilient member 152, causing the articulable linkage 150 to move from the first position to the second position. Movement of the articulable linkage 150 can apply tension to the cable 130, drawing a portion of the cable into the frame portion 142 as the articulable linkage extends. Motion of the cable 130, in turn, can cause corresponding motion of the hook 126 in the track 127 in the direction indicated by arrow 158 (FIG. 12), causing the hook to move from the first position to the second position and compressing the spring 128.

The locking mechanism 104 can be configured such that the strut member 110 pivots to a degree such that at least a locking member 160 of the guide member 112 moves past the hook 126 (e.g., left of the hook 126 in the illustrated embodiment) before the hook 126 begins to move. For example, the articulable linkage 150 of the actuator assembly 122 can extend a suitable distance from the vehicle wall 102 (e.g., about two inches) in the first position such that the peripheral flange 103 does not contact the articulable linkage (thereby initiating motion of the hook 126) until at least the locking member 160 of the guide member 112 has moved to the left of the hook 126. In this manner, when the guide member 112 reaches the second position (and the slide-room reaches the retracted position), the hook 126 can contact the locking member 160. In this manner, the hook 126 can prevent inadvertent motion of the guide member 112 (and thereby the strut member 110) toward the first position, to keep the slide-room in the retracted position.

In the retracted position, a portion of the slide-room (e.g., the flange 103) can be in contact with the articulable linkage 150 of the actuator assembly 122, thereby preventing motion of the articulable linkage. This can keep the hook 126 in contact with the locking member 160 against the compressed spring 128 via tension in the cable 130. When the slide-room is moved to the extended position, pressure applied against the articulable linkage 150 by the slide-room can be released, allowing the spring 128 to move to the uncompressed state. Motion of the spring 128 to the uncompressed state can cause motion of the hook 126 along the track 127 back to the first position, along with motion of the articulable linkage 150 of the actuator assembly 122 back to the first position via the cable 130. In the illustrated embodiment, an end portion of the track 127 can curve downwardly such that as the hook 126 moves toward the first position, it is directed away from the locking member 160, allowing the guide member 112 to move past the hook 126.

When the slide-room is in the retracted position, the strut member 110 can apply force to the vehicle wall 102 and the slide-room (via the bracket assembly 108) to retain the slide-room in the retracted position. The strut member 110 can cooperate with a slide mechanism 113 for moving the slide-room between the extended and retracted positions to apply pressure to sealing members (e.g., bulb seals) extending along the perimeter of the slide-room between the flange 103 and the vehicle wall 102 such that water leakage can be minimized. The slide mechanism 113 can be, for example, an electric motor operatively coupled to a set of gears, cables, chains, hydraulic members, etc., for moving the slide-room, and can be positioned beneath the slide-room, as shown in FIGS. 8A and 10A. In some examples, the strut member 110 can form an angle with the rear edge of the roof 106 and/or with a plane defined by the bracket assembly 108. In some embodiments, the angle can be from about 10 degrees to about 90 degrees. In some embodiments, the angle can be about 70 degrees. The strut member 110 can also prevent unwanted motion, particularly of the upper portion of the slide-room (e.g., tipping outward from the opening in the side wall), when operating the vehicle with the slide-room in the retracted position.

FIGS. 16 and 17 illustrate the bracket assembly 108 in greater detail. The bracket assembly can include a mounting flange 162 (mounted to the rear upper corner of the slide-room) and a compression adjustment assembly or mechanism 164 coupled to an upper portion of the mounting flange. The adjustment assembly 164 can include a housing 166, a compression adjustment member 168, a sliding member 170, a spring 172, a cap 174, and a clip 176. In the illustrated embodiment, the housing 166 can define an opening 178 extending longitudinally through the housing, and a slot 180 on an inwardly-facing (e.g., with respect to the vehicle wall 102) surface in communication with the opening 178.

In the illustrated embodiment, the compression adjustment member 168 is an extension of the strut member 110, and can be operable to vary the effective length of the strut member 110 (the distance between the end of the strut member 110 connected to the guide member 112 and the end of the compression adjustment member 168 connected to the housing 166). Thus, variation of the effective length of the strut member 110 can cause variation of an amount of compressive force applied by the strut member to the slide-room. For example, the compression adjustment member 168 can be received in an opening 182 in the end of the strut member 110, and can be threaded such that rotation of the compression adjustment member in the direction of arrow 171 causes axial movement of the compression adjustment member relative to the strut member in the direction of arrow 173. Since the strut member 110 extends from the rear of the slide-room to the inner surface of the vehicle wall 102, increasing the effective length urges the slide-room inwardly to increase the compressive force of the slide-room flange 103 against the exterior surface of the vehicle wall 102. Conversely, decreasing the effective length urges the slide-room outwardly to decrease the compressive force of the slide-room flange 103 against the exterior of the vehicle wall 102. Thus, a user can vary the effective length of the strut member by increasing or decreasing a proportion of the compression adjustment member 168 disposed in the strut member 110, thereby varying an amount of force exerted against the slide-room by the strut member when the slide-room is in the retracted position.

The compression adjustment member 168 can include a spherically or hemi-spherically shaped head 184 disposed in a correspondingly shaped socket defined in the housing 166 such that the compression adjustment member 168 (and thereby the strut member 110) can pivot within the housing about an axis defined by the head 184 as the strut member moves between the first position and the second position. In the illustrated embodiment, the head 184 can define a slot 186 for receiving the clip 176.

The sliding member 170 can be movably received in the housing 166 between the head 184 of the compression adjustment member 168 and the spring 172. The spring 172 can be retained in the housing 166 by the cap 174. The sliding member 170 can include a curved or angled surface 188 configured to contact the head 184 of the compression adjustment member and a slot 190. The spring 172 can urge the sliding member 170 against the compression adjustment member 168 such that the clip 176 is received in the slot 190 to prevent rotation of the compression adjustment member. This can prevent inadvertent loosening or tightening of the compression adjustment member (e.g., during operation of the vehicle).

As best shown in FIG. 17, the strut member 110 can be non-perpendicular with a plane defined by the bracket assembly 108 when the slide-room is in the retracted position (for example, the strut member can be at an angle of about 70 degrees). This can cause the head 184 (and the sliding member 170) to be located at different locations along the length of the housing 166 corresponding to the effective length of the strut member 110. For example, a relatively greater proportion of the compression adjustment member 168 disposed within the strut member 110 (corresponding to a shorter effective length) can result in the head 184 being positioned farther to the right in the housing 166. This can relieve compression of the spring 172, causing the sliding member 170 to move to the right in the housing 166 to remain in contact with the head 184. Conversely, a relatively lesser proportion of the compression adjustment member 168 disposed within the strut member 110 (corresponding to a greater effective length) can result in the head 184 being positioned farther to the left in the housing 166. This can cause the head 184 to move the sliding member 170 to the right in the housing 166 as well, compressing the spring 172.

Because the effective length of the strut member 110 corresponds to the degree of compressive force applied by the strut member to the slide-room, the position of the head 184 and/or the sliding member 170 in the housing 166 can serve as an indicator of the relative amount of compressive force exerted by the strut member against the slide-room when the slide-room is in the retracted position. In the illustrated embodiment, the sliding member 170 can include a visual indicator 194 to this effect. In some embodiments, the stiffness constant k of the spring 172 can be correlated with the position of the sliding member 170 in the housing 166 such that the location of the indicator 194 relative to, for example, one or more markings on the housing, can indicate application of a selected compressive load (e.g., 40 pounds) by the strut member 110 on the slide-room.

In other embodiments, the locking assemblies and systems disclosed herein can be implemented as electronic, electromechanical, and/or hydraulic systems. For example, the actuator assemblies 122 can be electronically actuated (e.g., by a contact or proximity switch activated by motion of or contact with a portion of the slide-room). The electronic actuator assemblies can be in electronic communication with retainer assemblies 114 configured as electronic or electromechanical retainer assemblies via, for example, a controller 195 (FIGS. 8A and 9A). The controller 195 can coordinate motion of the components of the retainer assemblies according to information of the position of the slide-room communicated by, for example, the actuator assemblies, the slide mechanism(s), or any other suitable sensor(s). In such embodiments, certain mechanical components such as the cable 132 may be unnecessary.

General Considerations

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatuses, and systems are not limited to any specific aspect or feature or combination thereof, nor do the disclosed embodiments require that any one or more specific advantages be present or problems be solved.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

Although the operations of some of the disclosed methods are described in a particular, sequential order for convenient presentation, it should be understood that this manner of description encompasses rearrangement, unless a particular ordering is required by specific language. For example, operations described sequentially may in some cases be rearranged or performed concurrently. Moreover, for the sake of simplicity, the attached figures may not show the various ways in which the disclosed methods can be used in conjunction with other methods. As used herein, the terms "a", "an", and "at least one" encompass one or more of the specified element. That is, if two of a particular element are present, one of these elements is also present and thus "an" element is present. The terms "a plurality of" and "plural" mean two or more of the specified element.

As used herein, the term "and/or" used between the last two of a list of elements means any one or more of the listed elements. For example, the phrase "A, B, and/or C" means "A", "B,", "C", "A and B", "A and C", "B and C", or "A, B, and C."

As used herein, the term "coupled" generally means physically coupled or linked and does not exclude the presence of intermediate elements between the coupled items absent specific contrary language.

In view of the many possible embodiments to which the principles of the disclosure may be applied, it should be recognized that the illustrated embodiments are only preferred examples and should not be taken as limiting the scope of the disclosure.

Accordingly, the scope of the disclosure is defined by the following claims. We therefore claim all that comes within the scope and spirit of these claims.

What is claimed is:

1. An assembly for retaining a slide-room of a recreational vehicle in a closed position, comprising:
    a strut member extending between the slide-room and a wall of the recreational vehicle, the strut member being pivotable between a first position and a second position corresponding to an extended position and a retracted position, respectively, of the slide-room;
    a guide member coupled to the strut member and movable therewith such that pivoting motion of the strut member between the first position and the second position causes corresponding linear motion of the guide member along a guide between a first position and a second position;
    wherein the strut member applies a compressive force to the slide-room and a vehicle wall adjacent the slide-room to inhibit movement of the slide-room when the slide-room is in the retracted position.

2. The assembly of claim 1, further comprising a retaining member adjacent the guide member and operable to engage the guide member in the second position when the slide-room is in the retracted position.

3. The assembly of claim 2, further comprising an actuator configured to be actuated by motion of the slide-room, and wherein the retaining member is movable by actuation of the actuator such that the retaining member engages the guide member when the slide-room is in the retracted position.

4. The assembly of claim 3, further comprising a controller operable to control motion of the retaining member based at least in part on information indicative of a position of the slide-room.

5. The assembly of claim 4, wherein the controller is operable to receive information indicative of the position of the slide-room from the actuator, a slide mechanism, or any combination thereof.

6. The assembly of claim 2, further comprising a compression adjustment mechanism coupled to the strut member and operable to adjust the compressive force exerted by the strut member against the slide-room when the slide-room is in the retracted position.

7. The assembly of claim 3, wherein the actuator includes an articulable linkage movable between a first position and a second position by motion of the slide-room.

8. The assembly of claim 7, wherein the articulable linkage includes first and second pivot members coupled to one another and movable between the first and second positions by contact with a peripheral flange of the slide-room.

9. The assembly of claim 2, wherein the guide member further comprises a locking member, and the retaining member is a hook configured to engage the locking member when the slide-room is in the retracted position.

10. The assembly of claim 1, wherein the strut member is mounted adjacent a corner of a roof and a side wall of the slide-room.

* * * * *